US008910888B2

(12) United States Patent
Sesser et al.

(10) Patent No.: US 8,910,888 B2

(45) Date of Patent: Dec. 16, 2014

(54) SPRINKLER LINEAR SIDE-LOAD, MULTI-NOZZLE SYSTEM

(75) Inventors: George L. Sesser, Walla Walla, WA (US); Barton R Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 248 days.

(21) Appl. No.: 13/556,324

(22) Filed: Jul. 24, 2012

(65) Prior Publication Data

US 2013/0026254 A1 Jan. 31, 2013

Related U.S. Application Data

(60) Provisional application No. 61/511,271, filed on Jul. 25, 2011.

(51) Int. Cl.

*B05B 1/16* (2006.01)
*B05B 1/12* (2006.01)
*B05B 1/30* (2006.01)
*B05B 1/32* (2006.01)
*B05B 15/02* (2006.01)
*F16K 3/00* (2006.01)
*B05B 3/02* (2006.01)
*B05B 1/26* (2006.01)

(52) U.S. Cl.

CPC ................. *B05B 1/1663* (2013.01); *B05B 3/02* (2013.01); *B05B 1/262* (2013.01); *B05B 15/0225* (2013.01)
USPC ........... 239/395; 239/114; 239/391; 239/586; 251/326

(58) Field of Classification Search

CPC .. B05B 1/1627; B05B 1/1663; B05B 1/1681; B05B 3/0486; F16K 3/02
USPC .......... 239/114, 115, 222.11, 222.13, 222.15, 239/222.17, 246–249, 390–392, 395, 396, 239/586, DIG. 1; 251/326, 327, 329
See application file for complete search history.

(56) References Cited

U.S. PATENT DOCUMENTS

| | | | | | |
|---|---|---|---|---|---|
| 609,578 | A | * | 8/1898 | Eastwood | 239/395 |
| 2,060,943 | A | | 11/1936 | Lieb | |
| 2,281,229 | A | * | 4/1942 | Bullock | 239/395 |
| 2,336,453 | A | * | 12/1943 | Bevington | 239/586 |
| 2,918,200 | A | | 12/1959 | Libit | |
| 3,342,420 | A | * | 9/1967 | Roulet et al. | 239/395 |
| 3,637,142 | A | | 1/1972 | Gassaway | |
| 3,863,841 | A | | 2/1975 | Berthoud | |
| 4,058,260 | A | | 11/1977 | Lestradet | |

(Continued)

OTHER PUBLICATIONS

U.S. Appl. No. 13/490,534, filed Jun. 7, 2012 (pending).

(Continued)

*Primary Examiner* — Darren W Gorman
(74) *Attorney, Agent, or Firm* — Nixon & Vanderhye P.C.

(57) ABSTRACT

A sprinkler head includes a sprinkler body formed with a through-bore defining a flow path adapted for alignment with a nozzle bore. A nozzle carrier is mounted on the sprinkler body for linear movement across the flow path and adapted to support plural nozzles. The nozzle carrier is configured to enable any one of the plural nozzles to be aligned with the flow path. The nozzle carrier is provided with plural discrete seal pads that are selectively movable into a position covering the flow path to thereby shut off flow through the sprinkler body.

22 Claims, 9 Drawing Sheets

(56) References Cited

U.S. PATENT DOCUMENTS

| | | | |
|---|---|---|---|
| 4,801,089 | A | 1/1989 | Zeman |
| 4,905,903 | A | 3/1990 | Katzer et al. |
| 5,125,578 | A | 6/1992 | Ballu |
| 5,234,169 | A | 8/1993 | McKenzie |
| 5,253,807 | A | 10/1993 | Newbegin |
| 5,335,859 | A | 8/1994 | Thayer et al. |
| 5,415,348 | A | 5/1995 | Nelson |
| 5,456,411 | A | 10/1995 | Scott et al. |
| 5,699,962 | A | 12/1997 | Scott et al. |
| 5,746,374 | A | 5/1998 | Simonetti et al. |
| 5,762,269 | A | 6/1998 | Sweet |
| 5,884,847 | A | 3/1999 | Christopher |
| 6,085,995 | A | 7/2000 | Kah, Jr. et al. |
| 6,182,909 | B1 | 2/2001 | Kah, Jr. et al. |
| 6,398,128 | B1 | 6/2002 | Hamilton et al. |
| 6,669,120 | B2 | 12/2003 | Vernia |
| 6,676,038 | B2 | 1/2004 | Gressett, Jr. et al. |
| 6,749,134 | B2 | 6/2004 | Arenson et al. |
| 6,772,964 | B2 | 8/2004 | Funseth et al. |
| 6,871,795 | B2 | 3/2005 | Anuskiewicz |
| 7,980,490 | B2 | 7/2011 | Waddelow et al. |
| 2002/0190140 | A1 | 12/2002 | Arenson et al. |
| 2009/0321543 | A1 | 12/2009 | Lawyer et al. |
| 2010/0102149 | A1 | 4/2010 | Lawyer et al. |

OTHER PUBLICATIONS

U.S. Appl. No. 13/626,472, filed Sep. 25, 2012 (pending).

U.S. Appl. No. 13/776,051, filed Feb. 25, 2013 (pending).

* cited by examiner

SPRINKLER LINEAR SIDE-LOAD, MULTI-NOZZLE SYSTEM

This application claims priority to U.S. Provisional Application No. 61/511,271 filed Jul. 25, 2011, the entire contents of which are hereby incorporated by reference.

BACKGROUND

This invention relates to rotary sprinklers generally, and more specifically to a linear side-loading, multi-nozzle arrangement for a sprinkler head.

Certain sprinklers commonly used in agricultural irrigation applications include a fixed nozzle that emits a stream to atmosphere and immediately impinges on a disk-like distribution plate mounted on a shaft. The distribution plate is typically formed with substantially radially-oriented grooves that are also curved in a circumferential direction, so that the stream impinging on the grooves causes the plate to rotate with (or relative to) the shaft. When it is desired to change to a different nozzle size, it is often necessary to shut the sprinkler off, at least partially disassemble the sprinkler head, remove and replace the nozzle, and then reassemble the sprinkler head. While attempts have been made to simplify the nozzle-changing process, such attempts to date have not been completely satisfactory.

At the same time, there are instances where desired sprinkling patterns may dictate that certain sprinklers along a truss span or other sprinkler support be periodically shut off to achieve the desired sprinkling pattern.

It would therefore be desirable to have a simple and quick nozzle-change arrangement, preferably including a shuttle or carrier supporting one or more additional and optionally-usable nozzles on the sprinkler head, combined with an automatic sprinkler shut-off feature. Preferably, the shut-off feature would shut off the water supply temporarily during the nozzle exchange, and then automatically restore the water supply upon locating the new nozzle in its operative or installed position. It would also be desirable if the shut-off feature could be used independently of the nozzle-exchange, so as to enable the sprinkler to be shut off and on as desired in a simple and reliable manner.

BRIEF DESCRIPTION OF THE INVENTION

The invention described herein incorporates a nozzle carrier that serves a dual purpose, i.e., the nozzle carrier permits interchange of at least two nozzles of different orifice size without having to remove any nozzle from the carrier; and, the nozzle carrier is formed with plural, axially-spaced and selectable shut-off surfaces or pads that are adapted to shut off flow through the sprinkler head.

Accordingly, in one exemplary but nonlimiting embodiment, there is provided a sprinkler head comprising a sprinkler body formed with a through-bore defining a flow path adapted for alignment with a nozzle bore; a nozzle carrier mounted on the sprinkler body for linear movement across the flow path and adapted to support plural nozzles, the nozzle carrier configured to enable any one of the plural nozzles to be aligned with the flow path; the nozzle carrier also provided with plural discrete seal pads, each selectively movable into a position covering the flow path and thereby shutting off flow through the sprinkler body.

In another exemplary but nonlimiting aspect, there is provided a sprinkler head comprising a sprinkler body formed with a bore defining a flow path adapted for alignment with a nozzle bore; a nozzle carrier supporting plural nozzles slidably supported on the sprinkler body for linear movement across the flow path, thereby enabling any one of the plural nozzles to be aligned with the flow path; the nozzle carrier provided with plural discrete seal pads for selectively covering the flow path thereby shutting off flow through the sprinkler body; substantially-parallel guide rails provided on a lower body portion of the sprinkler body, adapted to guide the nozzles as the nozzle carrier is moved across the flow path; and wherein an upper surface of the nozzle carrier is provided with discontinuous ribs along opposite side edges of the nozzle carrier adapted to interact with respective hooks on diametrically-opposed sides of the sprinkler body to thereby enable releasable locking of the nozzle carrier in any of plural selected positions.

In still another exemplary but nonlimiting embodiment, there is provided a sprinkler head comprising a sprinkler body having a center hub formed with a bore defining a flow passage with an inlet and an outlet; a nozzle carrier supporting two selectively usable nozzles each having a nozzle bore, the nozzle carrier slidably supported on the sprinkler body for linear movement across the flow passage, thereby enabling either of the nozzle bores to be aligned with the flow passage; the nozzle carrier provided with at least one discrete seal pad enabling selective covering of the flow passage, thereby shutting off flow through the sprinkler body.

It is also a feature of the exemplary embodiment to include one or more posts on the sprinkler body for cleaning debris from nozzle bores.

It is another feature of the exemplary embodiment to include shield portions on the sprinkler body to at least partially protect the nozzles in all positions of the nozzle carrier.

The invention will now be described in greater detail in connection with the drawings identified below.

DETAILED DESCRIPTION OF THE DRAWINGS

Figure 1:
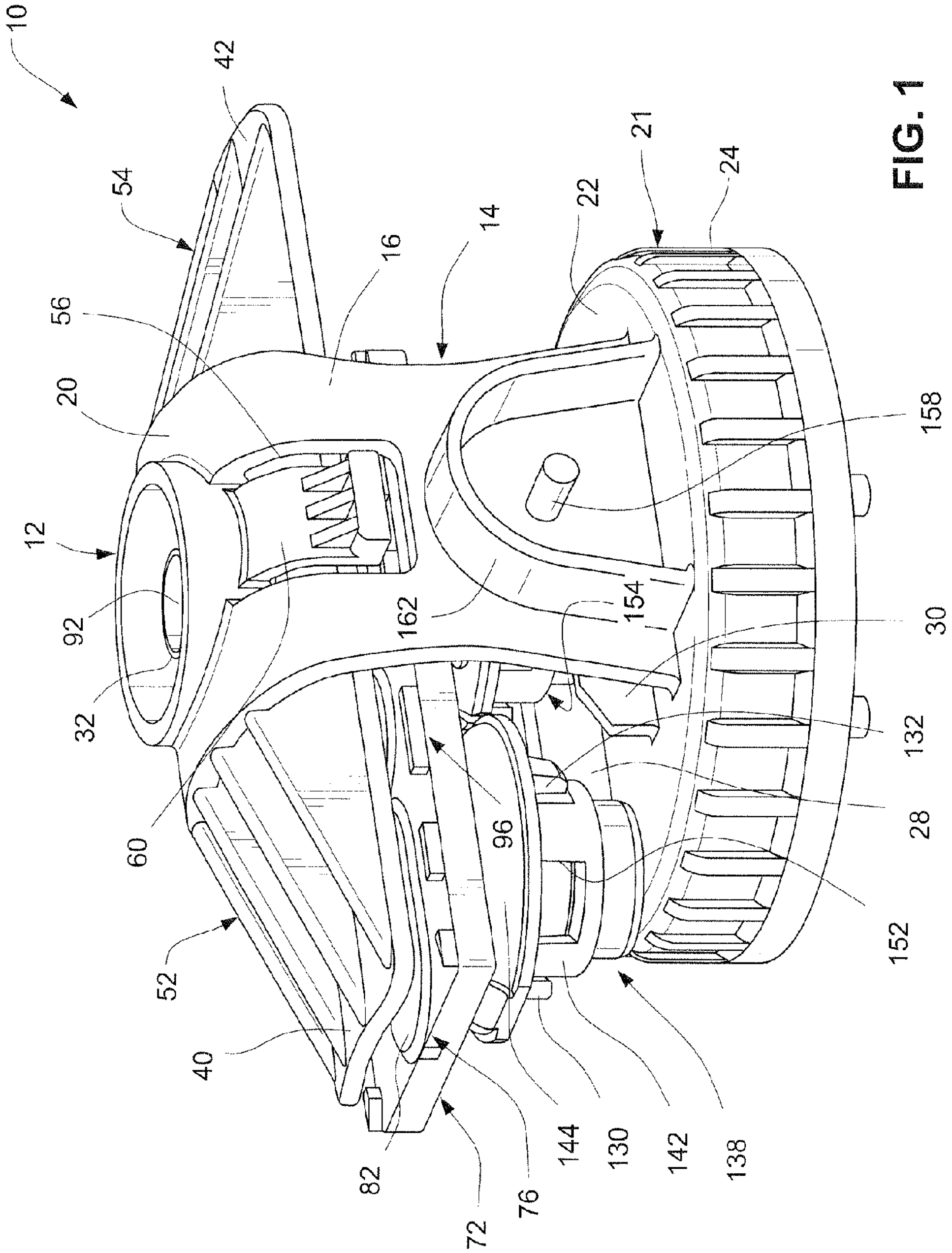
FIG. 1 is a perspective view of a sprinkler head in accordance with a first exemplary but nonlimiting embodiment of the invention illustrating one of two nozzles supported on a nozzle carrier in an operative or nozzle-installed position.

With reference initially to FIGS. 1, 2, 6 and 7, a sprinkler head or cap 10 is shown that is designed for use with an otherwise conventional rotary (or stationary) distributor plate (not shown) supported at the lower end of the sprinkler head. One example of a sprinkler of this type is the 3000 Series Orbitor sprinkler available from Nelson Irrigation Corp. (the assignee), but the side-load nozzle system of this invention may be adapted to any number of sprinkler heads/sprinklers where side-load nozzles may be advantageous, and including sprinkler heads that do not utilize rotating or stationary water deflector plates.

An integrated (or separable) adapter 12 permits the sprinkler head to be coupled to a source of water under pressure or other irrigation component, e.g., a drop tube, riser or a pressure regulator. The adapter 12 may include an o-ring or other suitable seal 13 to insure a sealing engagement with the end of the supply conduit, pressure regulator outlet, etc.

The sprinkler head body 14 also has a substantially inverted U-shaped center portion, with sides 16, 18 extending downwardly from an upper base or bridge 20 and joined to a cap portion 21 formed with a top panel 22. In the exemplary but nonlimiting embodiment described herein, the top panel 22 is provided with a peripheral skirt 24 formed with internal threads 26 which enable the sprinkler head to be attached to a lower body portion supporting the otherwise conventional rotary or stationary distributor plate (not shown). Within the open interior of the sprinkler head body 14, i.e., between the sides 16, 18 and under the bridge 20, there is a pair of parallel, upstanding guide rails 28, 30 extending across the cap top panel 22 (best seen in FIGS. 5, 6 and 7), on either side of a longitudinal center axis A (FIG. 6) through the body 14. These rails provide support and guidance for the selectively-usable nozzles as described in further detail below.

The adapter portion 12 of the body 14 encloses a cylindrical center hub 32 (FIGS. 1-5) formed with a through-bore (or simply, bore) 92 that defines a flow path or passage. The center hub 32 extends into a circular boss 34 (best seen in FIG. 7) downstream of the adapter 12. Thus, an annular groove 36 between the center hub 32 and the boss 34 receives an o-ring or other suitable annular seal 38 (FIGS. 2-5), preferably of EPDM rubber or other suitable material.

Figure 6:
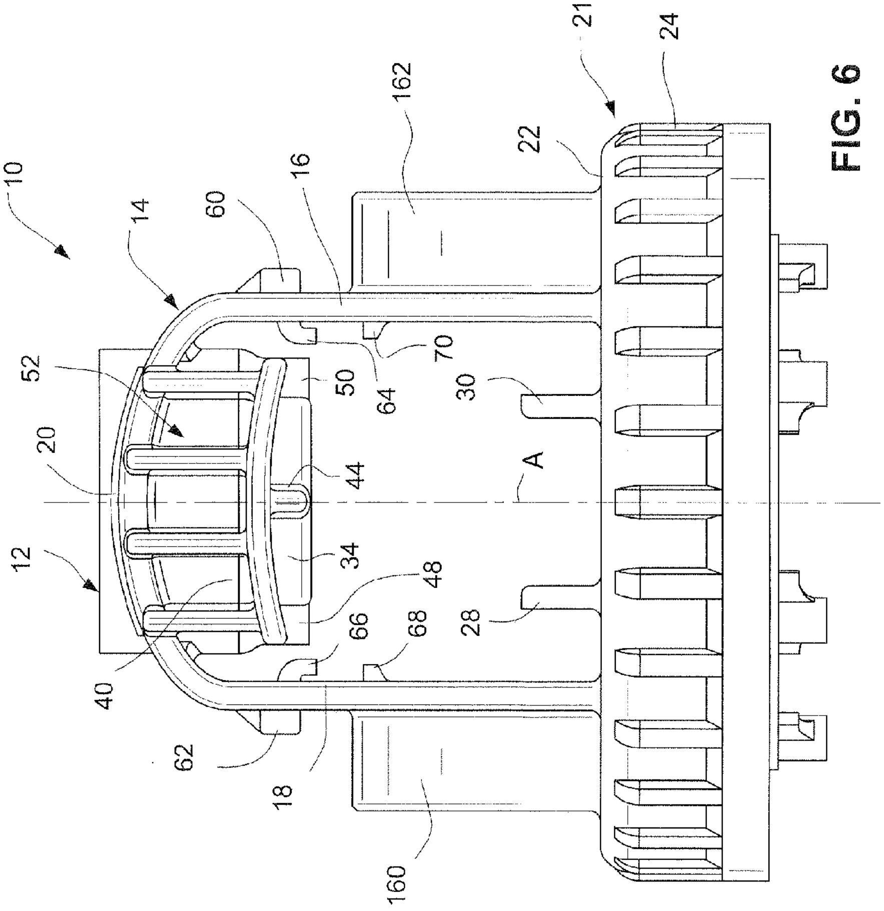
FIG. 6 is an end view of the sprinkler head shown in FIG. 1 but with the nozzle carrier removed.
Figure 7:
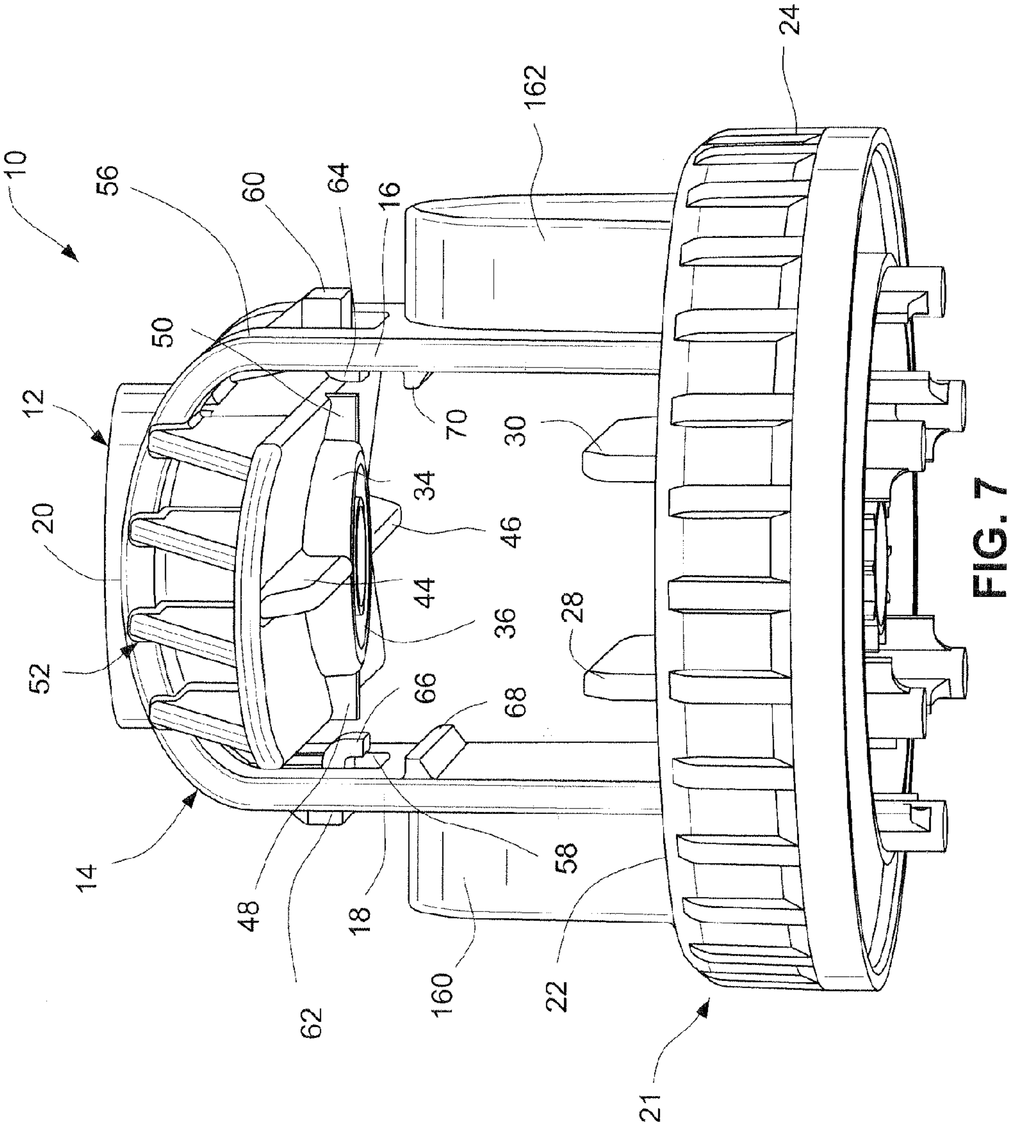
FIG. 7 is a perspective view of the sprinkler head shown in FIG. 6.

Diametrically-opposed, laterally-extending shield portions 40, 42 extend from the center hub 32, supported by ribs 44, 46, 48 and 50 (FIG. 7) extending as radial pairs from the center hub 32 (FIGS. 6, 7). The shield portions 40, 42 are reinforced on their respective upper sides by plural, angled gussets or rib groups 52, 54.

With reference especially to FIGS. 1, 6 and 7, in diametrically-opposed areas of the adapter 12, spaced 90° from the shield portions 40, 42 and at the interface between sides 16 and 18 and the bridge 20, there is a pair of respective cut-outs 56, 58 which receive respective squeeze tabs 60, 62 extending from the adapter 12. These squeeze tabs have hooks 64, 66 (FIGS. 5, 6 and 7) at their respective distal ends, the purpose for which will become apparent in the description below. Spaced below the tabs 60, 62, are a pair of laterally-oriented support ribs 68, 70 (FIGS. 5, 6 and 7) extending along the interior surfaces of sides 16, 18, respectively, that support a nozzle carrier or shuttle 72 also described in detail below in connection with FIGS. 8 and 9.

Figure 8:
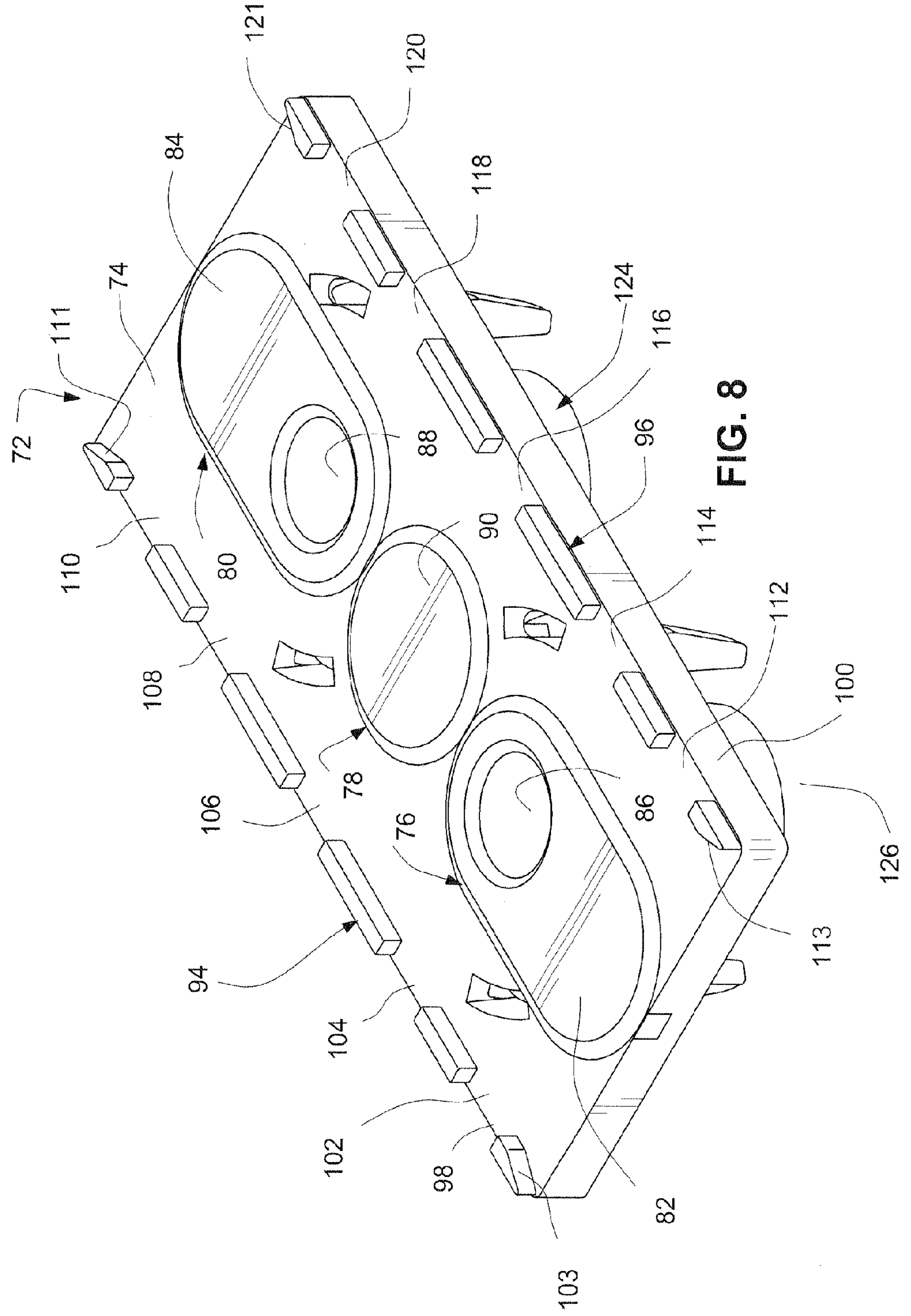
FIG. 8 is a top perspective view of the nozzle carrier without nozzles.
Figure 9:
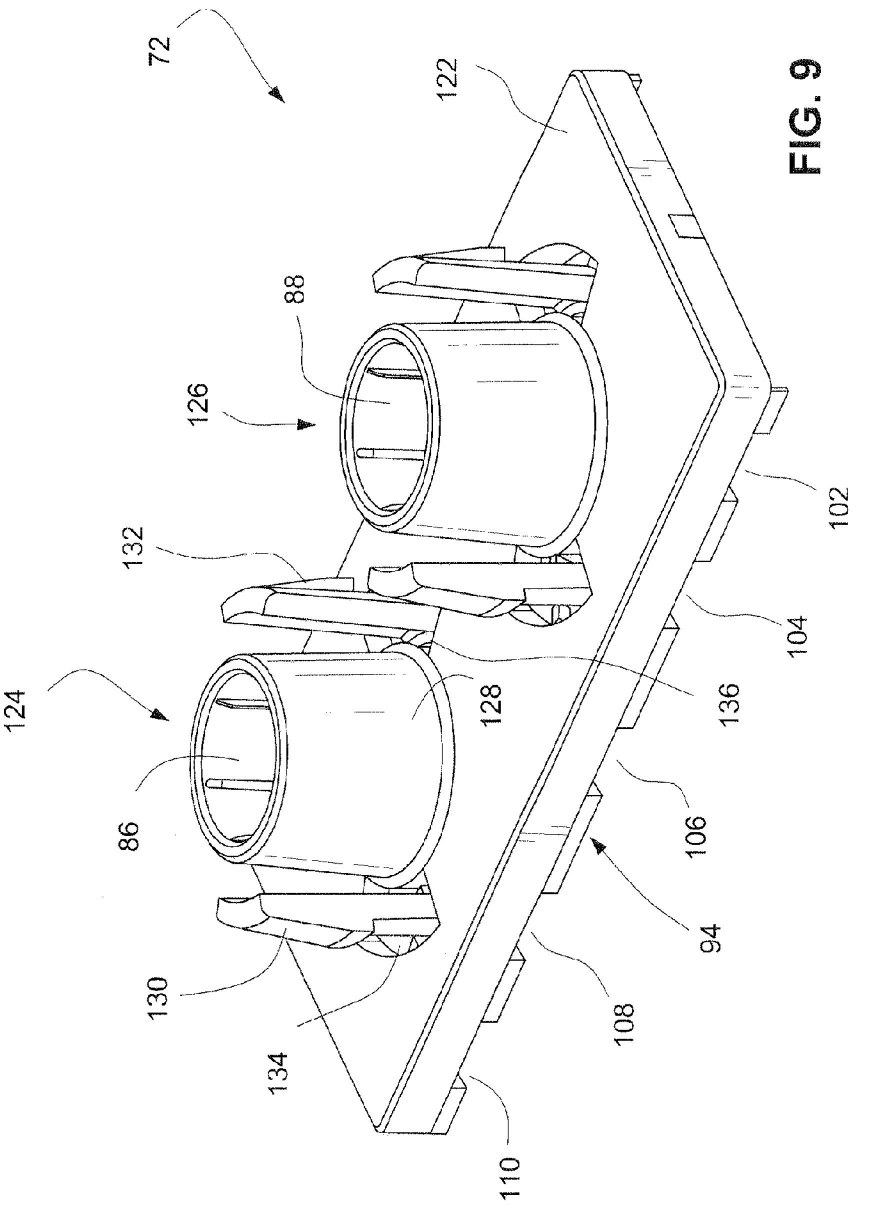
FIG. 9 is a bottom perspective view of the nozzle carrier shown in FIG. 8.

With particular reference to FIGS. 8 and 9, the nozzle carrier 72 is a substantially rectangular and relatively rigid plate, adapted to hold two sprinkler nozzles for selective use in the sprinkler head. A top surface 74 of the carrier is formed to include a series of laterally-aligned, raised seal pads 76, 78 and 80 that are adapted to selectively engage the seal 38 (FIGS. 2-5) at the lower or outlet end of the center hub 32.

In the exemplary embodiment, the outboard pads 76, are substantially race-track (or oval) shaped, and include flat, blank surfaces 82, 84, and adjacent holes 86, 88 located to sides of the surfaces 82, 84 nearest the center pad 78. The center pad 78 is circular in shape, with only a flat, blank surface 90.

The upper or top surface 74 of the carrier 72 is also provided with discontinuous, upstanding ribs 94, 96 extending in parallel along opposite sides 98, 100 of the carrier 72. The discontinuous rib 94 creates five-carrier position detents 102, 104, 106, 108 and 110. Similar, laterally-aligned position detents 112, 114, 116, 118 and 120 are established along the discontinuous rib 96, thus permitting the carrier 72, when inserted into the body 14 and supported by the support ribs 68, 70, to be moved to any one of five positions as determined by opposed pairs of the position detents, and releasably locked in the selected position by the hooks 64, 66 which can be resiliently sprung into any pair of the laterally-aligned or opposed position detents. The positioning of the carrier 72 is based on a user selection of one of two nozzle options, or on a user determination to shut off flow through the sprinkler head, using any of the blank surfaces 82, 84 or 90 as described further below.

With reference to FIG. 9, the underside or lower surface 122 of the carrier 72 is formed with a pair of substantially identical nozzle holder assemblies 124 and 126, only one of which need be described in detail. Nozzle holder assembly 124 includes a cylindrical support hub 128 having a bore 86 and a pair of resilient, diametrically-opposed retention tabs 130, 132, radially spaced from the support hub 128 and integrally formed with the carrier 72, with respective recesses 134, 136 permitting radially-oriented, resilient spring action of the retention tabs 130, 132 toward and away from the support hub.

Returning to FIGS. 1 and 2, an otherwise conventional nozzle 138 includes a radially inner nozzle hub 140 and a radially outer cylindrical portion 142 of greater diameter than the nozzle hub 140, terminating at a tapered ring or flange 144 which may be used as a nozzle-size identifier. Within the nozzle hub 140, there is a tapered nozzle bore 146 extending to a nozzle orifice 148 in an extended snout portion 150. The outer cylindrical portion 142 is formed with circumferentially-spaced windows 152. A substantially identical nozzle is shown and described in commonly-owned U.S. Pat. No. 5,415,348. As will be appreciated from any of FIGS. 1-4, the nozzle hub 140 may be inserted into the support hub 128 such that the outer cylindrical portion 142 engages the outer surface of the support hub 128, and with resilient retention tabs 130, 132 initially compressed and then expanded into the windows 152 to thereby secure the nozzle in place on the nozzle holder assembly 124 of the carrier 72. The nozzle 154, which differs only in orifice size, is similarly supported.

Figure 2:
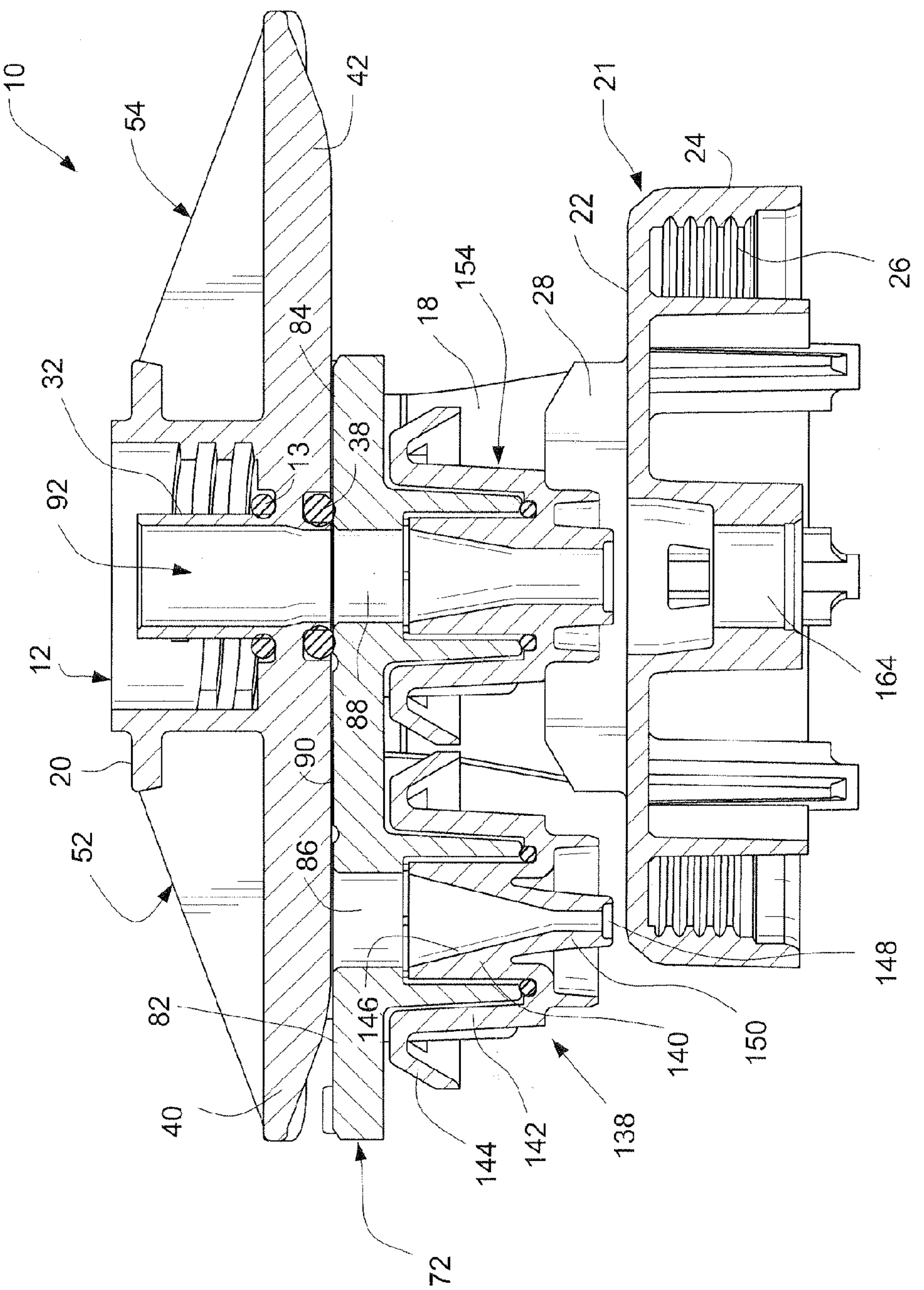
FIG. 2 is a sectioned side elevation, of the sprinkler head shown in FIG. 1.
Figure 5:
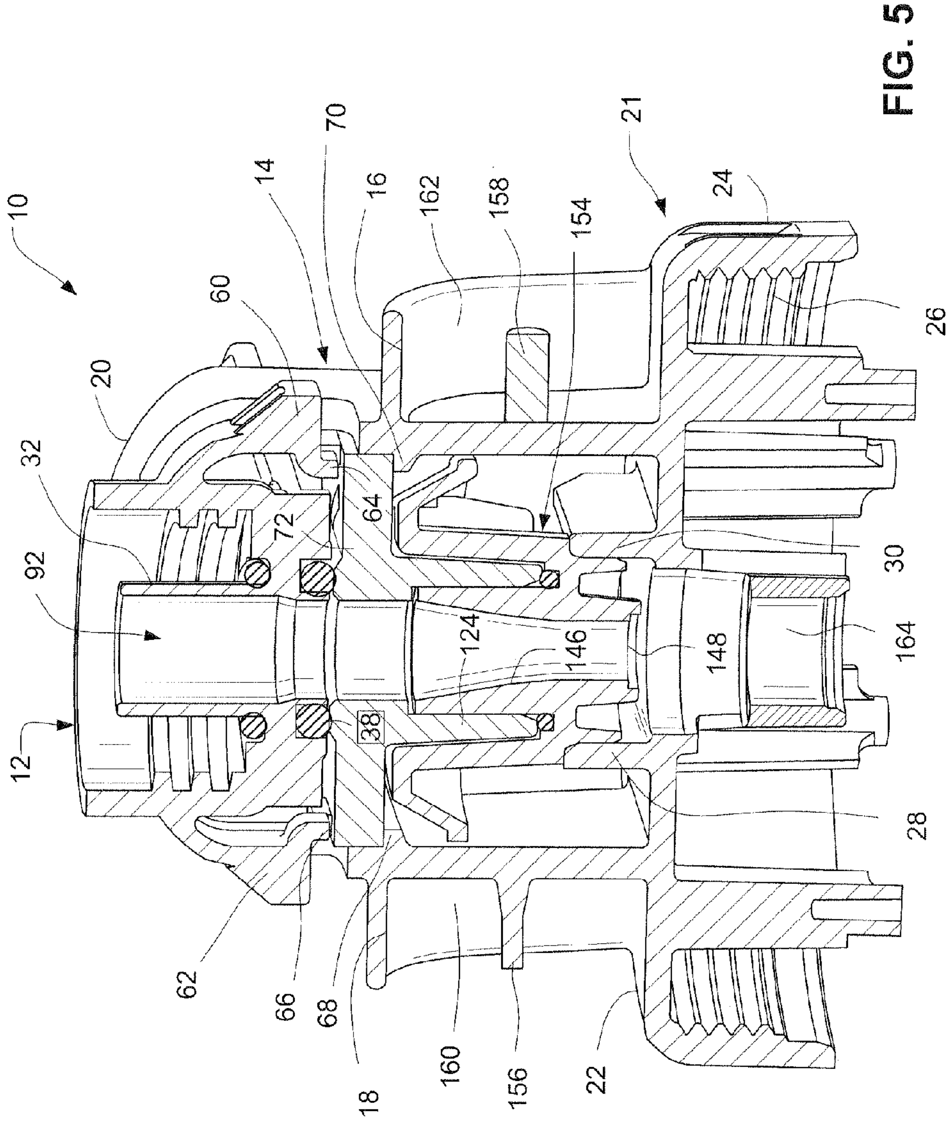
FIG. 5 is a sectioned end view of the sprinkler head shown in FIG. 1.

FIGS. 1, 2 and 5 show the carrier 72 inserted within the sprinkler body, supported on the lateral ribs 68, 70 (see FIG. 5). Because the end elements of the discontinuous ribs 94 and 96 are tapered at 103, 113 and 111, 121 (see FIG. 8), the carrier 72 may be inserted from either side of the sprinkler head body 14 simply by pushing the carrier 72 into the body along the support ribs 68, 70 and guided by guide rails 28, 30 until the squeeze tab hooks 64, 66 engage within either detents 112, 102 at one end of the carrier or detents 110, 120 at the opposite end of the carrier. The tapered rib elements will automatically cam the squeeze tab hooks 64, 66 inwardly such that the user need not squeeze the tabs 60, 62 manually for initial insertion. Subsequent movement to any one of the remaining detent positions will require the user to squeeze the tabs 60, 62 inwardly to disengage the hooks 64, 66 from the detents 112, 102 or 110, 120 and to release the squeeze tabs at the next selected detent position.

In FIGS. 1, 2 and 5, the carrier 72 is in a position where the nozzle 154 is aligned with the boss 34 (FIGS. 6, 7) and flow path or passage 92. In this nozzle-installed position, the hooks 64, 66 of squeeze tabs 60, 62 are seated in the aligned pair of position detents 108, 118 (FIG. 8) in the carrier 72.

Figure 3:
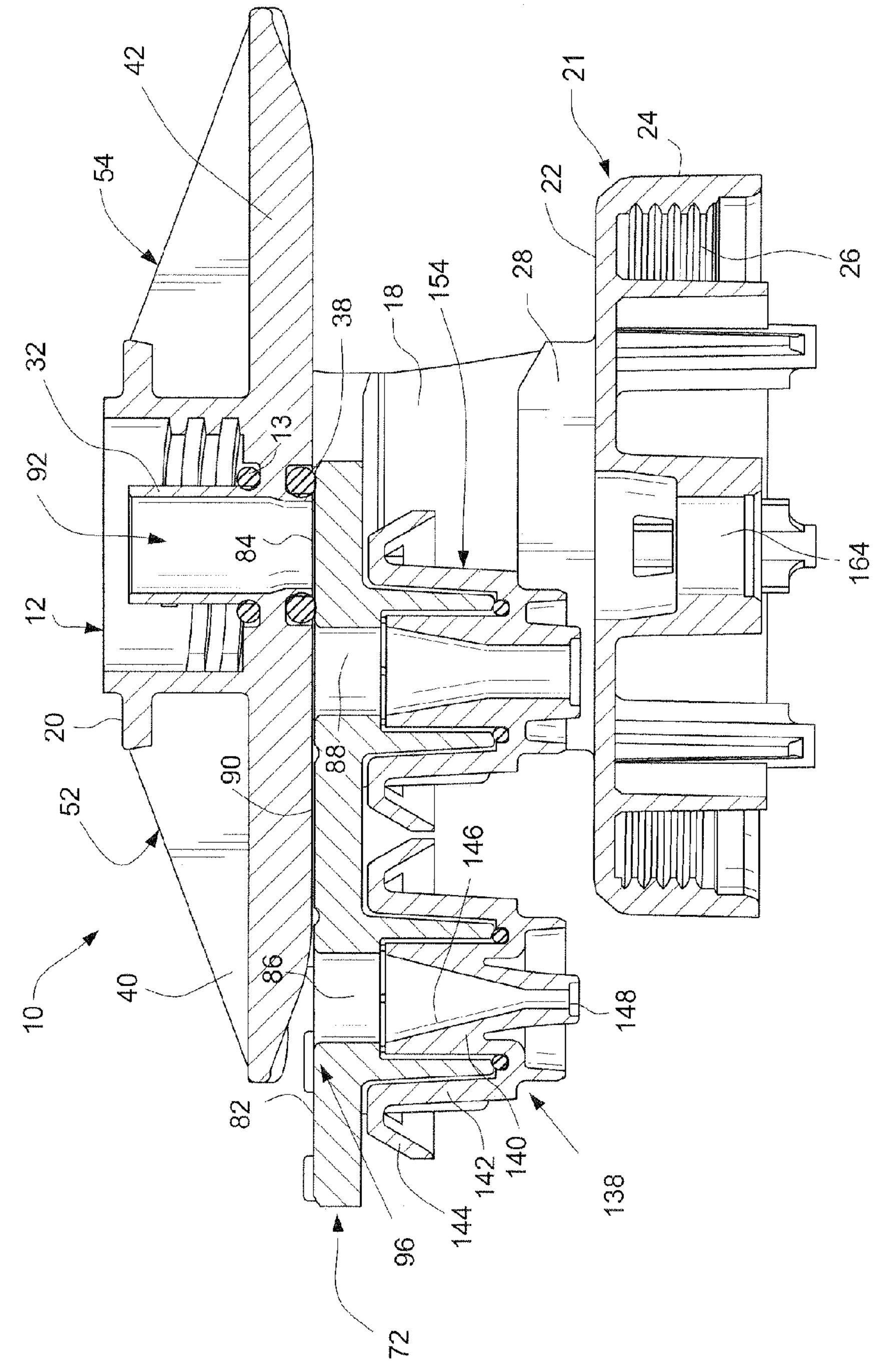
FIG. 3 is a sectioned side elevation similar to FIG. 2 but with the nozzle carrier moved to the left (relative to FIG. 2) to an outboard sprinkler shut-off position.

FIG. 3 shows the carrier 72 moved one step or position detent to the left (relative to FIG. 2), such that the flow passage 92 is aligned with the right outboard blank surface 84, thus shutting off flow through the sprinkler body. This step-wise movement is implemented by squeezing the tabs 60, 62 inwardly, thus moving the hooks 64, 66 out of the detents 108, 118 (FIG. 8), and then sliding the nozzle carrier to the left until the hooks 60, 62 are aligned with, and then released to spring into the position detents 110, 120. In this far-right, outboard sprinkler shut-off position, it can be seen that the nozzle 138 at the opposite end of the carrier 72 can be unplugged if needed, or swapped for a different-size nozzle. This position also facilitates loading of a first nozzle into the carrier 72 upon initial assembly of the carrier 72 to the body 14. With the first nozzle installed, the carrier 72 may be moved to the opposite outboard sprinkler shut-off position, enabling insertion of the second nozzle from the opposite end of the carrier.

Figure 4:
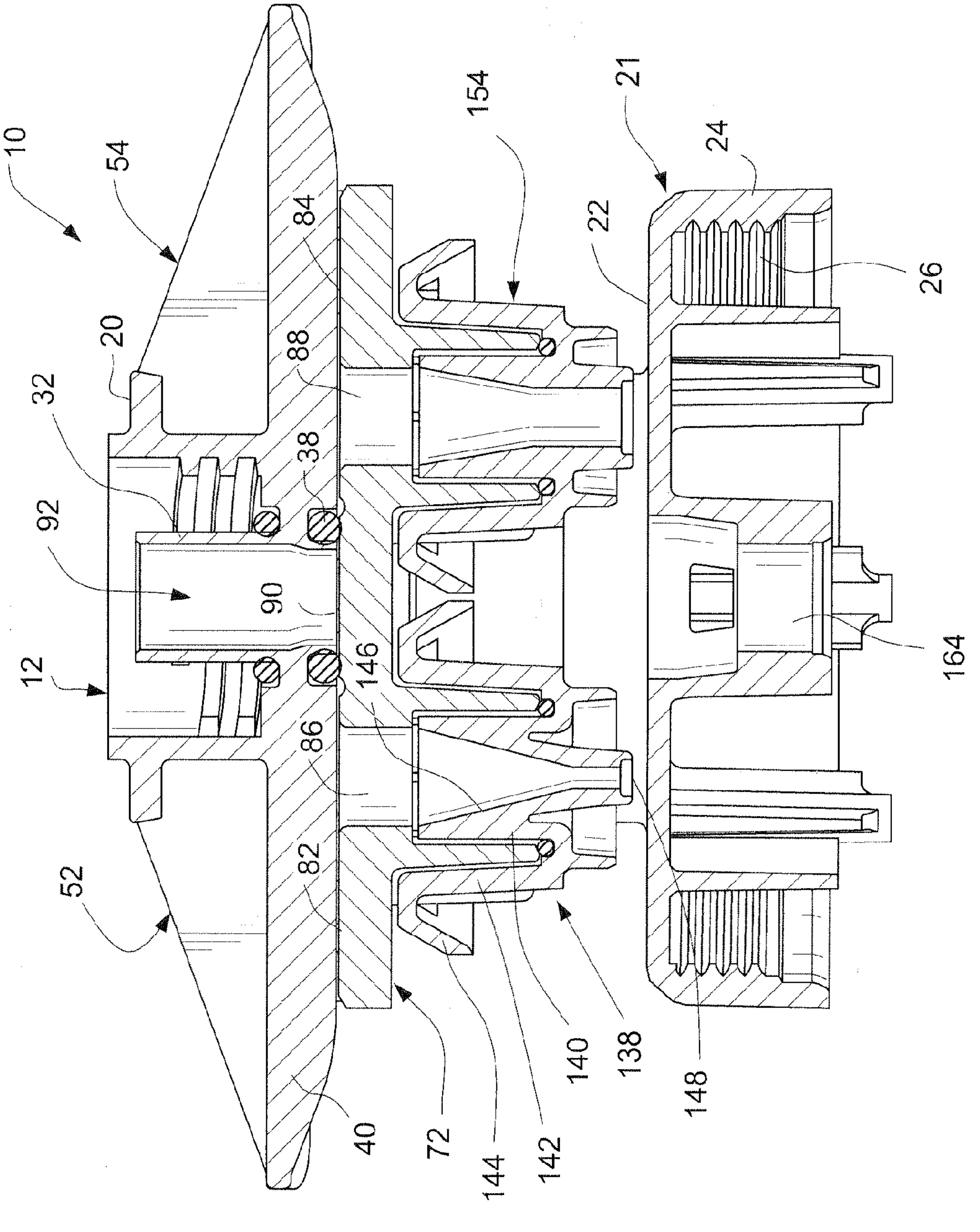
FIG. 4 is a sectioned side elevation similar to FIG. 3 but with the nozzle carrier moved to the right (relative to FIG. 3) to a center sprinkler shut-off position.

FIG. 4 illustrates the carrier 72 moved two positions to the right (relative to FIG. 3) to a center position where the flow passage 92 is aligned with the center flat or blank surface 90, again shutting off flow through the sprinkler body. In this selected sprinkler shut-off position, the hooks 64, 66 are seated in the center pair of position detents 106, 116 (FIGS. 8), and the nozzle carrier 72 and nozzles 138, 154 are fully protected by shields 40, 42. This center position may be used to shut off one or more sprinklers while the remaining sprinklers on a truss, for example, continue in an "on" position. This is done frequently, for example, to prevent overwatering near the pivot point of a center pivot system, or in other locations as determined by field conditions, crop location, etc.

It will be appreciated that moving the carrier 72 one step to the right (from the position in FIG. 4) will bring the nozzle 138 into a nozzle-installed position, where the nozzle bore is in alignment with the flow passage 92, and hooks 64, 66 are seated in position detents 104, 114 (FIG. 8).

One final step to the right will bring the outer blank surface 82 into alignment with the bore 92, (such that hooks 64, 66 are engaged in position detents 102, 112), again shutting off flow through the sprinkler body. In this far-left, outboard sprinkler shut-off position (opposite that shown in FIG. 3), the nozzle 154 may be unplugged or exchanged for a nozzle of different size. In all cases, the o-ring or other seal 38 insures a good water-tight seal between the flow passage 92 and holes 86, 88 or any of blank surfaces 82, 84 and 90.

Note also that when either nozzle 138 or nozzle 154 is in a nozzle-installed position, the unused nozzle will be protected by one or the other of shield portions 40, 42.

Thus, in the exemplary but nonlimiting embodiment described above, the nozzle carrier 72 can be moved to any one of at least five possible positions (two operative nozzle-installed positions and three sprinkler shut-off positions) without removing the carrier 72 from the sprinkler body 14.

It will be appreciated that while a two-nozzle carrier 72 has been shown and described, the invention also contemplates a carrier supporting one, three or more such nozzles.

It is another feature of the invention to include one or more side posts 156, 158 facing outwardly from the body 14, within side shrouds 160, 162, respectively (FIGS. 1 and 5). The posts 156, 158 may be employed by the user to unplug any debris from the nozzle bore of the unused nozzle, without having to remove the carrier 72 from the sprinkler body 14. The side posts 156, 158 may have different diameters to accommodate different nozzle sizes (compare post 156 to post 158).

In the exemplary but nonlimiting embodiment described herein, the peripheral skirt 24 of the cap portion 21 is adapted to support (e.g., by threads 88) a rotatable or stationary water distributor or deflector plate (not shown) that redirects water emitted axially from the nozzle orifice in radial directions as is well understood in the art. The manner in which the distributor plate is supported is also well within the skill of the art and forms no part of this invention. Note that an internal flow passage 164 in the cap portion 21, surrounded by the skirt 24, aligns with the flow passage 92 and the selected nozzle bore, thus extending the flow path axially to the distributor or deflector plate. As noted above, the shuttle or nozzle carrier 72 is also usable with other sprinkler heads that do not employ distribution or deflector plates.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A sprinkler head comprising:

a sprinkler body formed with a through-bore defining a flow path adapted for alignment with a nozzle bore; and a nozzle carrier mounted on said sprinkler body for linear movement across said flow path and adapted to support plural nozzles, said nozzle carrier configured to enable any one of said plural nozzles to be aligned with said flow path, said nozzle carrier also provided with plural discrete seal pads, each selectively movable into a position covering said flow path to thereby shut off flow through said sprinkler body.

2. The sprinkler head of claim 1 wherein said nozzle carrier has a lower surface supporting plural nozzle holders, each adapted to hold one of said plural nozzles, and an upper surface formed with said plural discrete seal pads.

3. The sprinkler head of claim 2 wherein said plural discrete seal pads comprise a round seal pad and a pair of oblong seal pads projecting above said upper surface.

4. The sprinkler head of claim 3 wherein said round seal pad is located between said two nozzle holders and provides a first shut-off surface, and said pair of oblong seal pads are located at opposite ends of said nozzle carrier, said pair of oblong seal pads having second and third shut-off surfaces and adjacent bores, respectively.

5. The sprinkler head of claim 4 wherein said two nozzle holders include open-ended cylindrical support hubs provided with said adjacent bores; and plural resilient, retention tabs radially spaced from said open-ended cylindrical support hubs, wherein, in use, a pair of nozzle hubs are inserted into said cylindrical support hubs and held by said plural, resilient retention tabs.

6. The sprinkler head of claim 1 wherein said through-bore is formed in an upper bridge connected to a lower body portion of said sprinkler body by a pair of substantially diametrically-opposed sides, said nozzle carrier supported on said diametrically-opposed sides below an outlet end of said through-bore.

7. The sprinkler head of claim 6 wherein substantially-parallel guide rails are provided on said lower body portion, adapted to guide said nozzles as the nozzle carrier is moved across said flow path.

8. The sprinkler head of claim 7 wherein an upper surface of said nozzle carrier is provided with discontinuous ribs along opposite side edges thereof adapted to interact with respective hooks on said diametrically-opposed sides to thereby enable releasable locking of said nozzle carrier in selected positions relative to said flow path.

9. A sprinkler head comprising:

a sprinkler body formed with a bore defining a flow path adapted for alignment with a nozzle bore;

a nozzle carrier supporting plural nozzles slidably supported on said sprinkler body for linear movement across said flow path, thereby enabling any one of said plural nozzles to be aligned with said flow path;

said nozzle carrier provided with plural discrete seal pads for selectively covering said flow path thereby shutting off flow through the sprinkler body;

substantially-parallel guide rails provided on a lower portion of said sprinkler body, adapted to guide said nozzles as the nozzle carrier is moved across said flow path; and wherein an upper surface of said nozzle carrier is provided with discontinuous ribs along opposite side edges of said nozzle carrier adapted to interact with respective hooks on diametrically-opposed sides of said sprinkler body to thereby enable releasable locking of said nozzle carrier in any of plural selected positions.

10. The sprinkler head of claim 9 wherein said nozzle carrier has a lower surface supporting at least two nozzle holders and said upper surface is provided with said plural discrete seal pads.

11. The sprinkler head of claim 10 wherein each nozzle holder comprises an open-ended support hub and plural, resilient retention tabs radially spaced from said support hub, wherein, in use, a nozzle hub is inserted into each of said open-ended support hubs and held by said plural, resilient retention tabs.

12. The sprinkler head of claim 9 wherein each of said plural discrete seal pads comprises a round or oblong surface raised above said upper surface.

13. The sprinkler head of claim 10 wherein said plural discrete seal pads comprise a round seal pad between said at least two nozzle holders and two oblong seal pads at opposite ends of said nozzle carrier, each of said oblong seal pads having a shut-off surface and an adjacent bore.

14. A sprinkler head comprising:

a sprinkler body having a center hub formed with a bore defining a flow passage with an inlet and an outlet;

a nozzle carrier supporting two selectively usable nozzles each having a nozzle bore, said nozzle carrier slidably supported on said sprinkler body for linear movement across said flow passage, thereby enabling either of said nozzle bores to be aligned with said flow passage; and said nozzle carrier provided with at least one discrete seal pad enabling selective covering of said flow passage, thereby shutting off flow through the sprinkler body, wherein said sprinkler body has a lower portion provided with upstanding ribs adapted to be engaged by said two nozzles when either of said two nozzles is in the nozzle-installed position.

15. The sprinkler head of claim 14 wherein said flow passage extends through said lower body portion.

16. The sprinkler head of claim 15 wherein said lower body portion includes a threaded skirt for connection to a water distribution plate.

17. A sprinkler head comprising:

a sprinkler body having a center hub formed with a bore defining a flow passage with an inlet and an outlet;

a nozzle carrier supporting two selectively usable nozzles each having a nozzle bore, said nozzle carrier slidably supported on said sprinkler body for linear movement across said flow passage, thereby enabling either of said nozzle bores to be aligned with said flow passage; and said nozzle carrier provided with at least one discrete seal pad enabling selective covering of said flow passage, thereby shutting off flow through the sprinkler body, wherein nozzle cleaning posts extend from opposite sides of said sprinkler body.

18. A sprinkler head comprising:

a sprinkler body having a center hub formed with a bore defining a flow passage with an inlet and an outlet;

a nozzle carrier supporting two selectively usable nozzles each having a nozzle bore, said nozzle carrier slidably supported on said sprinkler body for linear movement across said flow passage, thereby enabling either of said nozzle bores to be aligned with said flow passage; and said nozzle carrier provided with at least one discrete seal pad enabling selective covering of said flow passage, thereby shutting off flow through the sprinkler body, wherein said at least one discrete seal pad comprises a round seal pad located between two nozzle holders and providing a first shut-off surface, and a pair of oblong seal pads located at opposite ends of said nozzle carrier, said pair of oblong seal pads having second and third shut-off surfaces and adjacent bores, respectively, said adjacent bores adapted to align with the nozzle bores of said two nozzles.

19. The sprinkler head of claim 18 wherein said flow passage is formed in an upper bridge connected to a lower body portion of said sprinkler body by a pair of substantially diametrically-opposed sides, said nozzle carrier supported on said diametrically-opposed sides below an outlet end of said flow passage.

20. The sprinkler head of claim 19 wherein an upper surface of said nozzle carrier is provided with discontinuous ribs along opposite side edges thereof adapted to interact with respective hooks on said diametrically-opposed sides to thereby enable releasable locking of said nozzle carrier in selected positions relative to said flow passage.

21. The sprinkler head of claim 20 wherein said respective hooks are formed on respective resilient squeeze tabs formed in said diametrically-opposite sides.

22. The sprinkler head of claim 1 wherein a coupling element is supported downstream of said nozzle carrier, said coupling element adapted for connection with a water deflection plate which, in use, is impinged upon by a stream emitted from one of said nozzles aligned with said flow passage.

* * * * *